United States Patent
Chen

(10) Patent No.: US 8,638,412 B2
(45) Date of Patent: Jan. 28, 2014

(54) THIN FILM TRANSISTOR LIQUID CRYSTAL DISPLAY DEVICE, SUBSTRATE, AND MANUFACTURING METHOD THEREOF

(75) Inventor: Cheng-Hung Chen, Shenzhen (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 85 days.

(21) Appl. No.: 13/503,656

(22) PCT Filed: Feb. 23, 2012

(86) PCT No.: PCT/CN2012/071527
§ 371 (c)(1),
(2), (4) Date: Apr. 23, 2012

(87) PCT Pub. No.: WO2013/123663
PCT Pub. Date: Aug. 29, 2013

(65) Prior Publication Data
US 2013/0215348 A1    Aug. 22, 2013

(30) Foreign Application Priority Data
Feb. 21, 2012  (CN) .......................... 2012 1 0039615

(51) Int. Cl.
*G02F 1/1343* (2006.01)

(52) U.S. Cl.
USPC ............................ 349/143; 349/144; 349/147

(58) Field of Classification Search
USPC ......................................... 349/143, 144, 147
See application file for complete search history.

(56) References Cited

U.S. PATENT DOCUMENTS

2010/0253869 A1 *  10/2010  Ting et al. ....................... 349/48

* cited by examiner

*Primary Examiner* — Phu Vu
(74) *Attorney, Agent, or Firm* — Cheng-Ju Chiang

(57) ABSTRACT

The present invention discloses a thin-film transistor (TFT) liquid crystal display device, a substrate, and a manufacturing method thereof. The TFT substrate includes: a glass substrate and signal lines, scan lines, a first pixel electrode, a second pixel electrode, a common electrode, and the TFT. The first pixel electrode and the second pixel electrode at least partially overlap each other. The second pixel electrode forms a plurality of horizontally arranged slits and the first pixel electrode forms a hollow structure in a portion overlapping the second pixel electrode. Through the above method, the present invention increases transmittance, improve view angle color shift, and improve the quality of image.

18 Claims, 6 Drawing Sheets

THIN FILM TRANSISTOR LIQUID CRYSTAL DISPLAY DEVICE, SUBSTRATE, AND MANUFACTURING METHOD THEREOF

BACKGROUND OF THE INVENTION

1. Field of the Invention

The present invention relates to the technical field of display device, and in particular to a thin-film transistor (TFT) liquid crystal display (LCD) device, a substrate, and a manufacturing method thereof.

2. The Related Arts

TFT LCD device is a member of the liquid crystal displays family and using TFT techniques helps improve image quality. The core components of a TFT LCD comprise a liquid crystal panel and the liquid crystal panel is composed of a TFT substrate, a color filter substrate, and a liquid crystal layer interposed between the two. An alignment layer is present between the liquid crystal layer and the TFT substrate or the color filter substrate and the alignment layer makes the liquid crystal contained in the liquid crystal layer showing a predetermined pre-tilt angle.

As shown in FIG. 1, FIG. 1 is a schematic view showing a planar structure of a pixel of conventional multi-domain vertical alignment (PSVA) TFT substrate. The TFT substrate comprises a glass substrate 10 and signal lines 11, scan lines 12, a pixel electrode 13, a common electrode 14, and a TFT that are formed on the substrate 10. The signal lines 11 and the scan lines 12 both are a plurality of conductive lines arranged in an equally-spaced manner and intersect each other as being horizontally and vertically laid, respectively. Two adjacent ones of both the signal lines 11 and the scan lines 12 collectively enclose and delimit one pixel. The pixel electrode 13 is set within a display region of the pixel and is generally divided into four zones. The pixel electrode 13 has a central portion that is of a cruciform shape and a plurality of fingers 16 extends from the cruciform central portion in directions toward a circumference of the pixel display region. Slits 17 are defined between adjacent fingers of the pixel electrode 13. The common electrode 14 extends in the direction of the scan lines 12 from one side of the pixel to the opposite side. When a potential difference exists between the pixel electrode 13 and the common electrode 14, the liquid crystal molecules tilt in four directions. Through optic or thermal reactive material contained in the liquid crystal or the alignment layer, the liquid crystal molecules on the surface of the alignment layer can be fixed to form a predetermined pre-tilt angle in the four directions.

When the TFT is in operation, the vertical component of electrical field above the electrode slits 17 is relatively small and the liquid crystal molecules cannot show the most effectively tilting, whereby the brightness of the area of the electrode slits 17 is dimmer than the area of the pixel electrode 13. Further, the brightness and the transmittance of the pixel are closely related to the width of the electrode slits 17. During the process of manufacturing, when abnormality of the width of the electrode slits 17 occur, a defect of local irregularity of the brightness of an image is identified, resulting in quality problems of the image.

SUMMARY OF THE INVENTION

The primary technical issue to be addressed by the present invention is to provide a thin-film transistor liquid crystal display device, a substrate, and a manufacturing method thereof and the present invention helps increase transmittance, improve view angle color shift, and improve image quality.

To address the above technical issue, the present invention adopts a technical solution by providing a thin-film transistor liquid crystal display device, which comprises: a color filter substrate, a thin-film transistor substrate, and a liquid crystal layer interposed between the color filter substrate and the thin-film transistor substrate; the thin-film transistor substrate comprising a glass substrate and signal lines, scan lines, a first pixel electrode, a second pixel electrode, a common electrode, and a thin-film transistor formed on the glass substrate; the thin-film transistor comprising a gate terminal, a source terminal, and a drain terminal, the gate terminal being electrically connected to the scan line, the drain terminal being electrically connected to the signal line; a via hole being formed above the source terminal so that the source terminal is electrically connected through the via hole to the second pixel electrode; the signal line and the scan line being respectively arranged horizontally and vertically to intersect each other, the first pixel electrode and the second pixel electrode being located in a pixel display region that is enclosed and delimited by two adjacent signal lines and two adjacent scan lines that intersect each other; the common electrode being at least partially located in the pixel display region and extending in a direction of the scan line from one side of a pixel to an opposite side; the first pixel electrode and the second pixel electrode being sequentially formed on the common electrode; the first pixel electrode being spaced from the common electrode and the second pixel electrode in a vertical direction, the first pixel electrode partially overlapping the second pixel electrode; the second pixel electrode forming a plurality of horizontally arranged slits, the first pixel electrode forming a hollow structure in a portion thereof that overlaps the second pixel electrode; whereby when the pixel display region displays a bright condition, the first pixel electrode and the second pixel electrode both apply voltages to the pixel display region to operate in brightness saturation.

Wherein, the second pixel electrode forms a plurality of horizontally arranged first fingers and a plurality of slits between the first fingers and the first pixel electrode forms a plurality of horizontally arranged second fingers and a plurality of slits between the second fingers, the first fingers of the second pixel electrode being formed above and corresponding to the slits of the first pixel electrode, the second fingers of the first pixel electrode being formed under and corresponding to the slits of the second pixel electrode.

Wherein, the second fingers of the first pixel electrode and the first fingers of the second pixel electrode are of the same width.

Wherein, a via hole is formed above the source terminal and the source terminal is electrically connected through the via hole to the second pixel electrode.

Wherein, the first pixel electrode and the second pixel electrode each have a central portion that is cruciform and comprise a plurality of fingers extending from the cruciform central portion in directions toward a perimeter of the pixel display region.

Wherein, the common electrode is in the form of a strip and arranged to correspond to a horizontal section of the cruciform central portion of the first pixel electrode, whereby the first pixel electrode and the common electrode at least partially overlap each other, the first pixel electrode forming a window opening in the overlapping site, the second pixel electrode covering the window opening.

Wherein, the second pixel electrode, when put in operation, forms first coupling capacitance in the site of the window opening, the first coupling capacitance comprising a capacitor formed between the second pixel electrode and color filter substrate and the common electrode; the second pixel electrode forming second coupling capacitance in a site that is not the window opening, the second coupling capacitance comprising a capacitor formed between the second pixel electrode and the first pixel electrode, the color filter substrate, and the common electrode.

Wherein, when the pixel display region displays a bright condition, the first pixel electrode and the second pixel electrode both apply voltages to the pixel display region to operate in brightness saturation.

To address the above technical issue, the present invention adopts another technical solution by providing a thin-film transistor substrate of liquid crystal display device, which comprises: a glass substrate and signal lines, scan lines, a first pixel electrode, a second pixel electrode, a common electrode, and a thin-film transistor formed on the glass substrate; the thin-film transistor comprising a gate terminal, a source terminal, and a drain terminal, the gate terminal being electrically connected to the scan line, the drain terminal being electrically connected to the signal line; a via hole being formed above the source terminal so that the source terminal is electrically connected through the via hole to the second pixel electrode; the signal line and the scan line being respectively arranged horizontally and vertically to intersect each other, the first pixel electrode and the second pixel electrode being located in a pixel display region that is enclosed and delimited by two adjacent signal lines and two adjacent scan lines that intersect each other; the common electrode being at least partially located in the pixel display region and extending in a direction of the scan line from one side of a pixel to an opposite side; the first pixel electrode and the second pixel electrode being sequentially formed on the common electrode; the first pixel electrode being spaced from the common electrode and the second pixel electrode in a vertical direction, the first pixel electrode partially overlapping the second pixel electrode; the second pixel electrode forming a plurality of horizontally arranged slits, the first pixel electrode forming a hollow structure in a portion thereof that overlaps the second pixel electrode; whereby when the pixel display region displays a bright condition, the first pixel electrode and the second pixel electrode both apply voltages to the pixel display region to operate in brightness saturation.

Wherein, the second pixel electrode forms a plurality of horizontally arranged first fingers and a plurality of slits between the first fingers and the first pixel electrode forms a plurality of horizontally arranged second fingers and a plurality of slits between the second fingers, the first fingers of the second pixel electrode being formed above and corresponding to the slits of the first pixel electrode, the second fingers of the first pixel electrode being formed under and corresponding to the slits of the second pixel electrode.

Wherein, the second fingers of the first pixel electrode and the first fingers of the second pixel electrode are of the same width.

Wherein, the first pixel electrode and the second pixel electrode each have a central portion that is cruciform and comprise a plurality of fingers extending from the cruciform central portion in directions toward a perimeter of the pixel display region.

Wherein, the common electrode is in the form of a strip and arranged to correspond to a horizontal section of the cruciform central portion of the first pixel electrode, whereby the first pixel electrode and the common electrode at least partially overlap each other, the first pixel electrode forming a window opening in the overlapping site, the second pixel electrode covering the window opening.

Wherein, when the pixel display region displays a bright condition, the first pixel electrode and the second pixel electrode both apply voltages to the pixel display region to operate in brightness saturation.

To address the above technical issue, the present invention adopts a technical solution by providing a method for manufacturing thin-film transistor liquid crystal display device, which comprises:

depositing a first metal layer on a glass substrate to form a scan line, a gate terminal of a thin-film transistor, and a common electrode, wherein the gate terminal is electrically connected to the scan line and the common electrode extends in a direction of the scan line from one side of a pixel to an opposite side;

sequentially depositing a first insulation layer, an active layer, an ohmic contact layer, and a second metal layer on the first metal layer to form a signal line and a source terminal and a drain terminal of the thin-film transistor, wherein the signal line and the scan line intersect each other and the drain terminal is electrically connected to the signal line;

depositing a second insulation layer on the second metal layer and forming a via hole above the source terminal, wherein the via hole extends through the second insulation layer above the source terminal;

depositing a first transparent conductive layer on the second insulation layer and the via hole to form a first pixel electrode, wherein the first pixel electrode is located in a pixel display region enclosed by the intersected signal line and scan line;

sequentially depositing a third insulation layer and a second transparent conductive layer on the first transparent conductive layer to form a second pixel electrode, wherein the second pixel electrode is located in the pixel display region enclosed by the intersected signal line and scan line, a via hole being formed above the source terminal, the source terminal being electrically connected through the via hole to the second pixel electrode, the first pixel electrode being spaced from the common electrode and the second pixel electrode in a vertical direction, the first pixel electrode and the second pixel electrode at least partially overlapping each other, the second pixel electrode forming a plurality of horizontally arranged slits, the first pixel electrode forming a hollow structure in a portion thereof overlapping the second pixel electrode, whereby when the pixel display region displays a bright condition, the first pixel electrode and the second pixel electrode both apply voltages to the pixel display region to operate in brightness saturation.

Wherein, the second pixel electrode forms a plurality of horizontally arranged first fingers and a plurality of slits between the first fingers and the first pixel electrode forms a plurality of horizontally arranged second fingers and a plurality of slits between the second fingers, the first fingers of the second pixel electrode being formed above and corresponding to the slits of the first pixel electrode, the second fingers of the first pixel electrode being formed under and corresponding to the slits of the second pixel electrode.

Wherein, the second fingers of the first pixel electrode and the first fingers of the second pixel electrode are of the same width.

Wherein, the first pixel electrode and the second pixel electrode each have a central portion that is cruciform and comprise a plurality of fingers extending from the cruciform central portion in directions toward a perimeter of the pixel display region.

Wherein, the common electrode is in the form of a strip and arranged to correspond to a horizontal section of the cruciform central portion of the first pixel electrode, whereby the first pixel electrode and the common electrode at least partially overlap each other, the first pixel electrode forming a window opening in the overlapping site, the second pixel electrode covering the window opening.

The efficacy of the present invention is that to be distinguished from the state of the art, the present invention adds a second pixel electrode on the basis that a TFT that already has a first pixel electrode and makes a hollow structure in a portion of the first pixel electrode that overlaps the second pixel electrode, whereby adjusting the voltage level of the first pixel electrode may achieve an effect of improving view angle color shift and thus improving the quality of image.

Further, when the signal line applies a predetermined voltage, the first pixel electrode provides an effect of voltage division with respect to the common electrode and the second pixel electrode so as to obtain different voltage difference. When the first pixel electrode and the second pixel electrode simultaneously get saturated for brightness, increased pixel transmittance can be obtained thereby improving the transmittance. Further, different pixel voltages correspond to different tilt angle of liquid crystal and this also provides an effect of improving view angle color shift and thus improving the quality of image.

Further, the first pixel electrode forms a window opening in an overlapping site thereof with the common electrode of which an object is to increase storage capacitance between the common electrode and the second pixel electrode.

DETAILED DESCRIPTION OF THE PREFERRED EMBODIMENTS

A detailed description of a thin-film transistor (TFT) liquid crystal display (LCD), a substrate, and a manufacturing method thereof according to the present invention will given in order to more clearly disclose specifics and spirit of the present invention.

The present invention provides an embodiment of TFT LCD. The TFT LCD comprises a color filter substrate, a TFT substrate, and a liquid crystal layer interposed between the color filter substrate and the TFT substrate.

Figure 1:
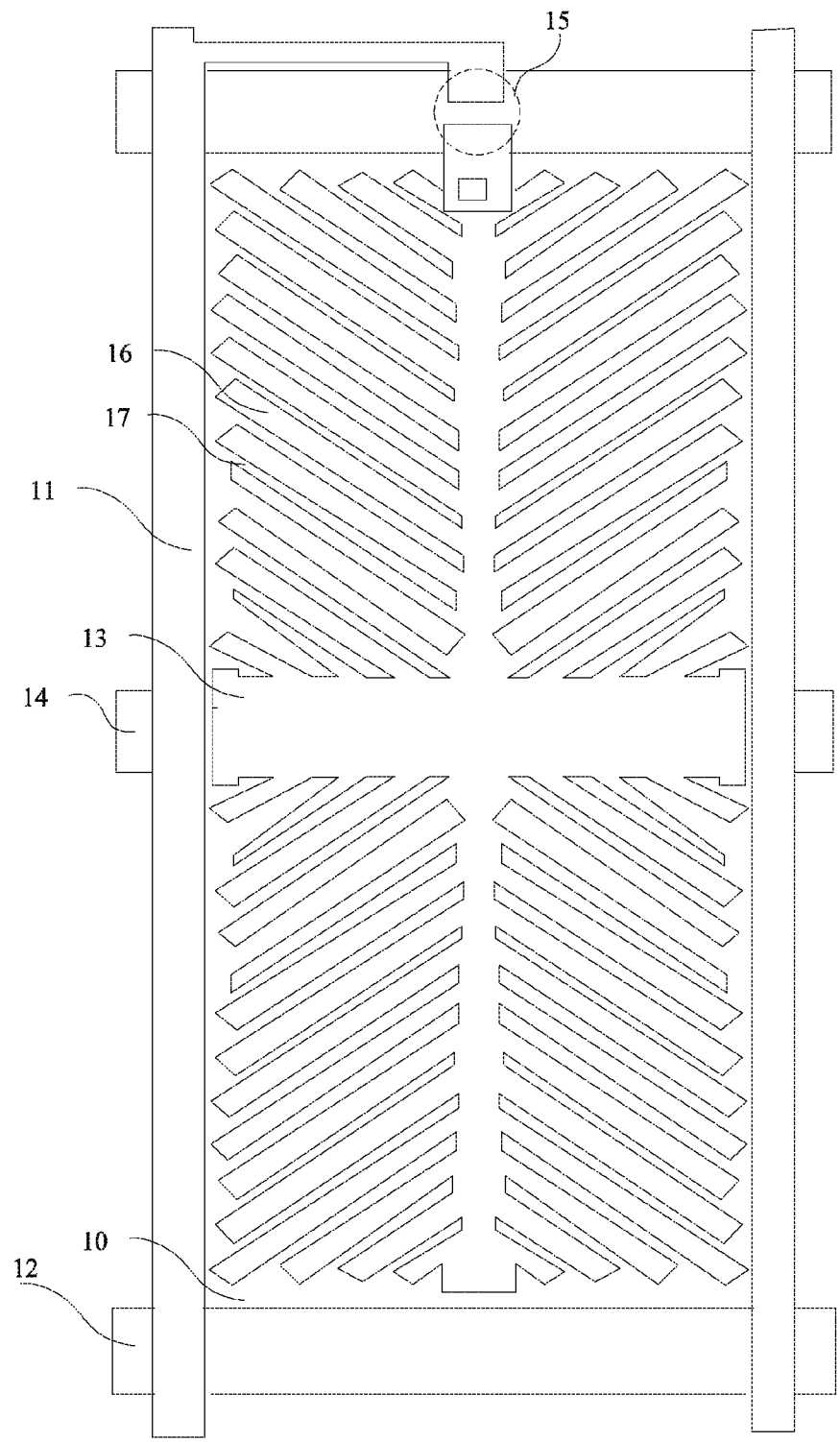
FIG. 1 is a schematic view showing a planar structure of a pixel of conventional PSVA thin-film transistor substrate.
Figure 2:
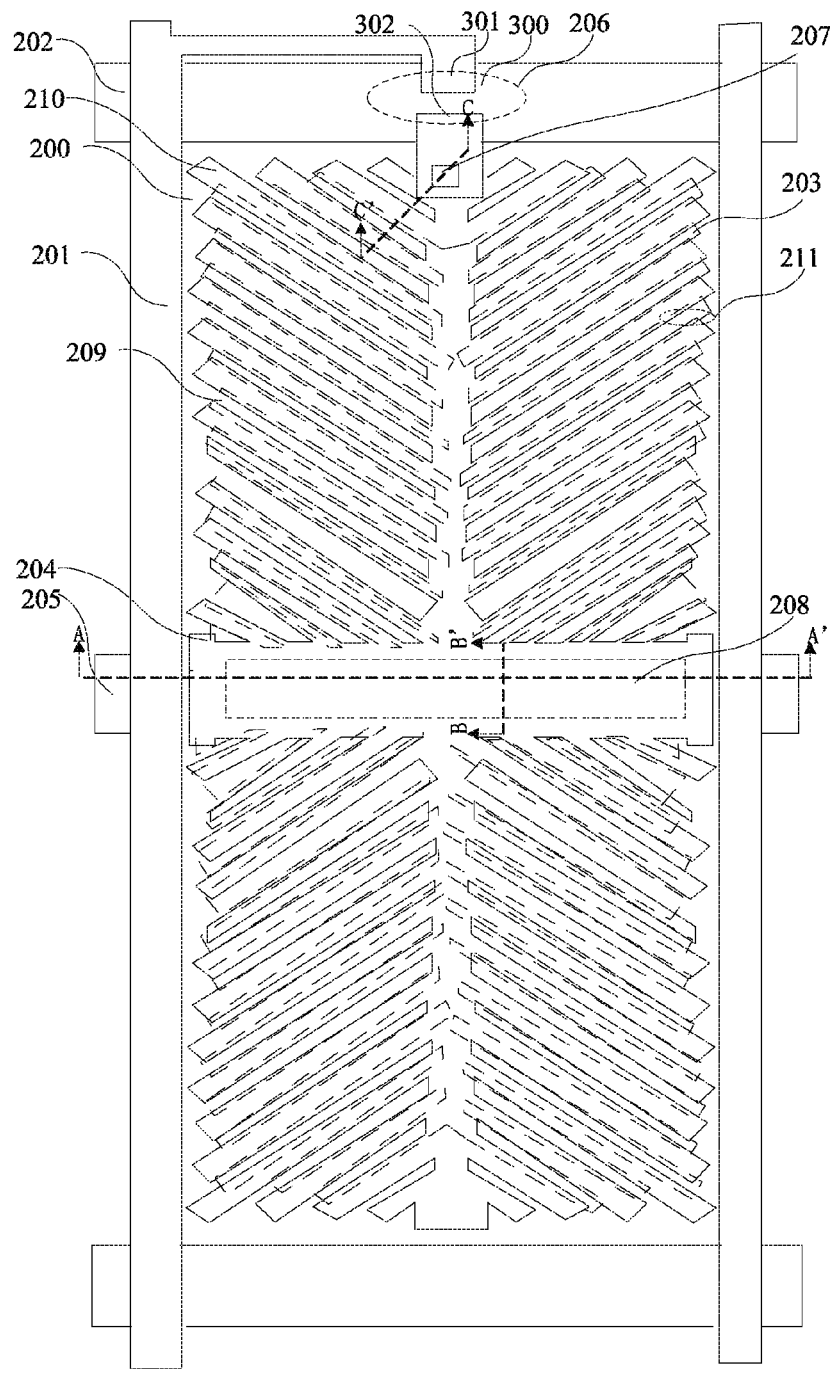
FIG. 2 is a schematic view showing a planar structure of a pixel of a first embodiment of thin-film transistor substrate according to the present invention.

Referring to FIG. 2, FIG. 2 is a schematic view showing a planar structure of a pixel of a first embodiment of TFT substrate according to the present invention. The embodiment of the present invention comprises: a glass substrate 200, signal lines 201, scan lines 202, a first pixel electrode 203, a second pixel electrode 204, a common electrode 205, and a TFT 206. The TFT 206 has a source terminal 302 above which a via hole 207 is formed, and through the via hole 207, the second pixel electrode 204 is electrically connected to the source terminal 302 of the TFT 206.

Figure 3:
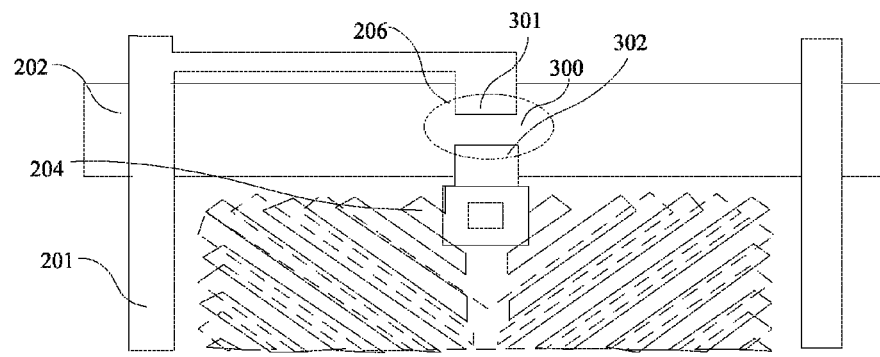
FIG. 3 is a partial enlarged view of the pixel of FIG. 2.

Also referring to FIG. 3, FIG. 3 is a partial enlarged view of the pixel of FIG. 2. The TFT 206 comprises a gate terminal 300, a drain terminal 301, and the source terminal 302. The gate terminal 300 is electrically connected to a scan line 202. The drain terminal 301 is electrically connected to a signal line 201. The source terminal 302 is electrically connected to the second pixel electrode 204. The TFT 206 serves as a switch of the pixel and controls whether and how the second pixel electrode 204 generates an electrical field. The signal line 201 and the scan line 202 are operable to control the TFT 206 in order to realize the function of generating electrical field and how to generate the electrical field.

The scan lines 202 and the signal lines 201 are arranged horizontally and vertically, respectively, to intersect each other. Two adjacent scan lines 202 and two adjacent signal lines 201, which intersect each other, collectively enclose and delimit a pixel display region of pixel.

The common electrode 205 is in the form of a strip and is partially located within the pixel display region. The common electrode 205 extends in the direction of the scan line 202 from one side of the pixel to the opposite side.

Figure 4:
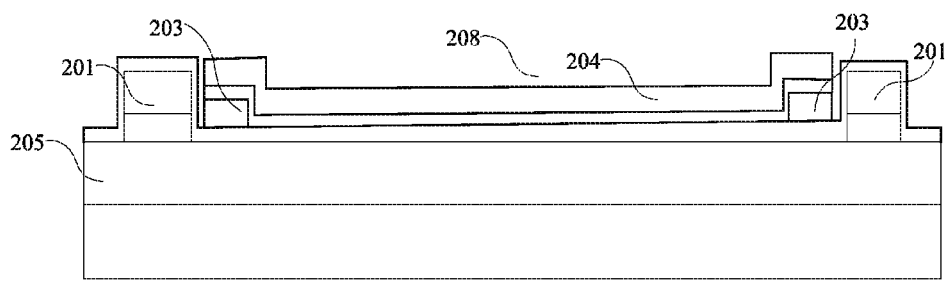
FIG. 4 is a cross-sectional view of the pixel of FIG. 2 taken along line A-A'.
Figure 5:
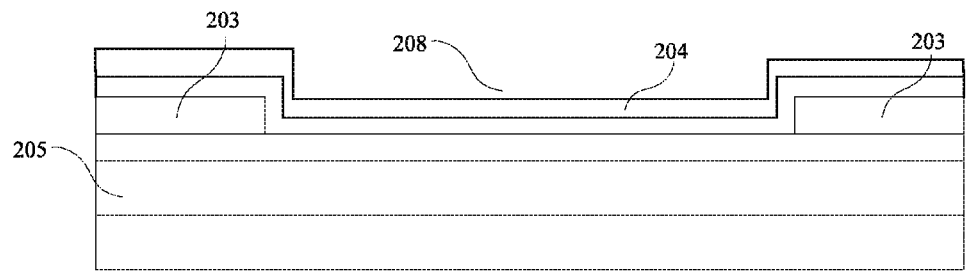
FIG. 5 is a cross-sectional view of the pixel of FIG. 2 taken along line B-B'.

Also referring to FIGS. 4 and 5, the first pixel electrode 203 and the second pixel electrode 204 are sequentially formed on the common electrode 205. The common electrode 205 is a strip arranged to correspond to a horizontal section of a cruciform central portion of the first pixel electrode 203, whereby the first pixel electrode 203 and the common electrode 205 partially overlap each other. The first pixel electrode 203 forms a window opening 208 in the overlapping site in such a way that the second pixel electrode 204 covers the window opening 208.

In operation, a scan line integrated circuit module or a signal line integrated circuit module supplies a desired voltage to the common electrode 205. By controlling a voltage difference between the common electrode 205 and the second pixel electrode 204, rotation of the liquid crystal molecules contained in the liquid crystal layer can be controlled to achieve the desired object of displaying. The common electrode 205 is not limited, in configuration, to the strip like form and the configuration of the common electrode 205 can be changed according to the practical needs.

Both the first pixel electrode 203 and the second pixel electrode 204 have a central portion that is cruciform and comprise a plurality of fingers extending from the cruciform central portion in directions toward a perimeter of the pixel display region. The first pixel electrode 203 and the common electrode 205 are shown partially overlapping each other, but it is apparent that they can completely overlap each other. The first pixel electrode 203 forms a window opening 208 in the overlapping site, and the second pixel electrode 204 covers the window opening 208.

Figure 6:
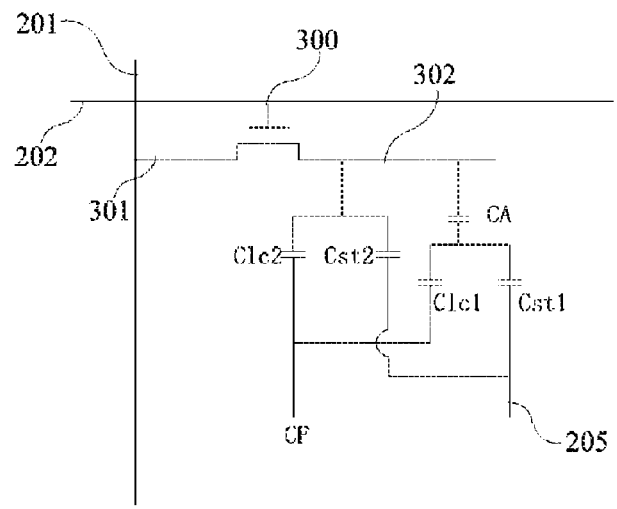
FIG. 6 is a schematic view showing circuit structure of the thin-film transistor substrate of the thin-film transistor shown in FIG. 2.

Also referring to FIG. 6, the second pixel electrode 204 forms first coupling capacitance in the site of the window opening 208 and the first coupling capacitance is composed of a capacitor Clc2 formed between the second pixel electrode 204 and a common electrode of the color filter substrate and a capacitor Cst2 formed between the second pixel electrode 204 and the common electrode 205. The second pixel electrode 204 forms second coupling capacitance at the overlapping site of the first pixel electrode 203 and the common electrode 205 and the second coupling capacitance is composed of a capacitor CA formed between the second pixel electrode 204 and the first pixel electrode 203, a capacitor Clc1 formed between the second pixel electrode 204 and the common electrode of the color filter substrate, and a capacitor Cst1 formed between the second pixel electrode 204 and the common electrode 205.

When the TFT 206 is in operation, by changing the magnitude of the capacitor CA, the voltage of the first pixel electrode 203 and the second pixel electrode 204 can be changed to realize the object of changing color shift.

Figure 7:
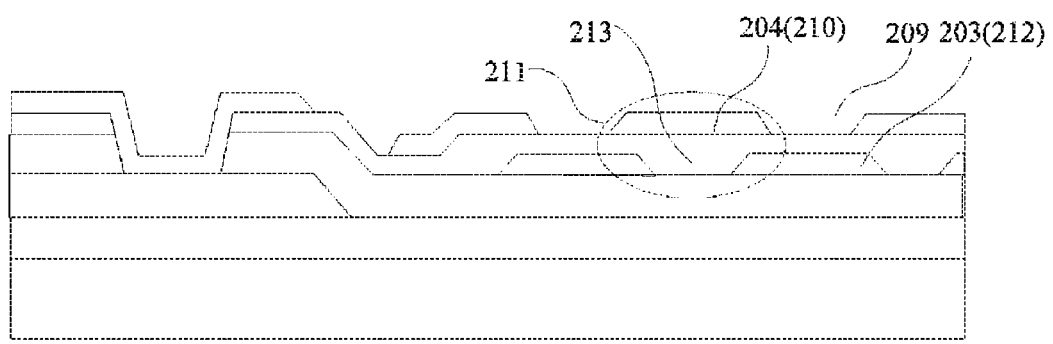
FIG. 7 is a cross-sectional view of the pixel of FIG. 2 taken along line C-C'.

Referring to FIG. 7, the first pixel electrode 203 and the second pixel electrode 204 are arranged to partially overlap. The second pixel electrode 204 forms a plurality of horizontally arranged first fingers 210 and slits 209 between the first fingers 210. Further, the first pixel electrode 203 forms a plurality of horizontally arranged second fingers 212 and slits 213 between the second fingers 212. The first pixel electrode 203 forms a hollow structure 211 in a portion overlapping the second pixel electrode 204. Namely, the fingers 212 of the pixel electrode 203 are formed, in a corresponding manner, under the slits 209 of the second pixel electrode 204; and the fingers 210 of the second pixel electrode 204 are formed, in a corresponding manner, above the slits 213 of the first pixel electrode 203.

The second fingers 212 of the first pixel electrode 203 and the first fingers 210 of the second pixel electrode 204 are both fingers of identical widths. Apparently, the fingers 212 of the first pixel electrode 203 may have a width that is identical to width of the fingers 210 of the second pixel electrode 204, or they can be different. The slits 213 of the first pixel electrode 203 are of the same width and the slits 209 of the second pixel electrode 204 are of the same width. Arranging the fingers to have the same width and the slits having the same width realizes uniformity of pixel displaying so as to improve color shift.

When no first pixel electrode 203 exists, the distribution of electric lines of force in the area of the slits 209 of the second pixel electrode 204 is different from that in the area of the fingers 210 of the second pixel electrode 204. This results in different tilt angles of the liquid crystal molecules in the area of the slits 209 of the second pixel electrode 204 and the liquid crystal molecules in the area of the fingers 210 of the second pixel electrode 204, making the brightness in the area of the slits 209 of the second pixel electrode 204 dimmer that that in the area of the fingers 210 of the second pixel electrode 204, and a quality problem associated with visual color shift occurs. The embodiment of the present invention provides a hollow structure at the portion of the first pixel electrode 203 that overlaps the second pixel electrode 204 to have the first pixel electrode 203 generating a capacitance effect. The capacitance effect regulates the voltage of the first pixel electrode 203 and the second pixel electrode 204 so as to improve the tilt angles of the liquid crystal molecules in the two areas thereby improve view angle color shift an thus the displaying quality.

At the time when the voltage of the first pixel electrode 203 and the second pixel electrode 204 reaches a maximum level, the brightness of the pixel reaches brightness saturation. Thus, by applying the first pixel electrode 203 and the above described driving method, the transmittance can be further improved.

Figure 8:
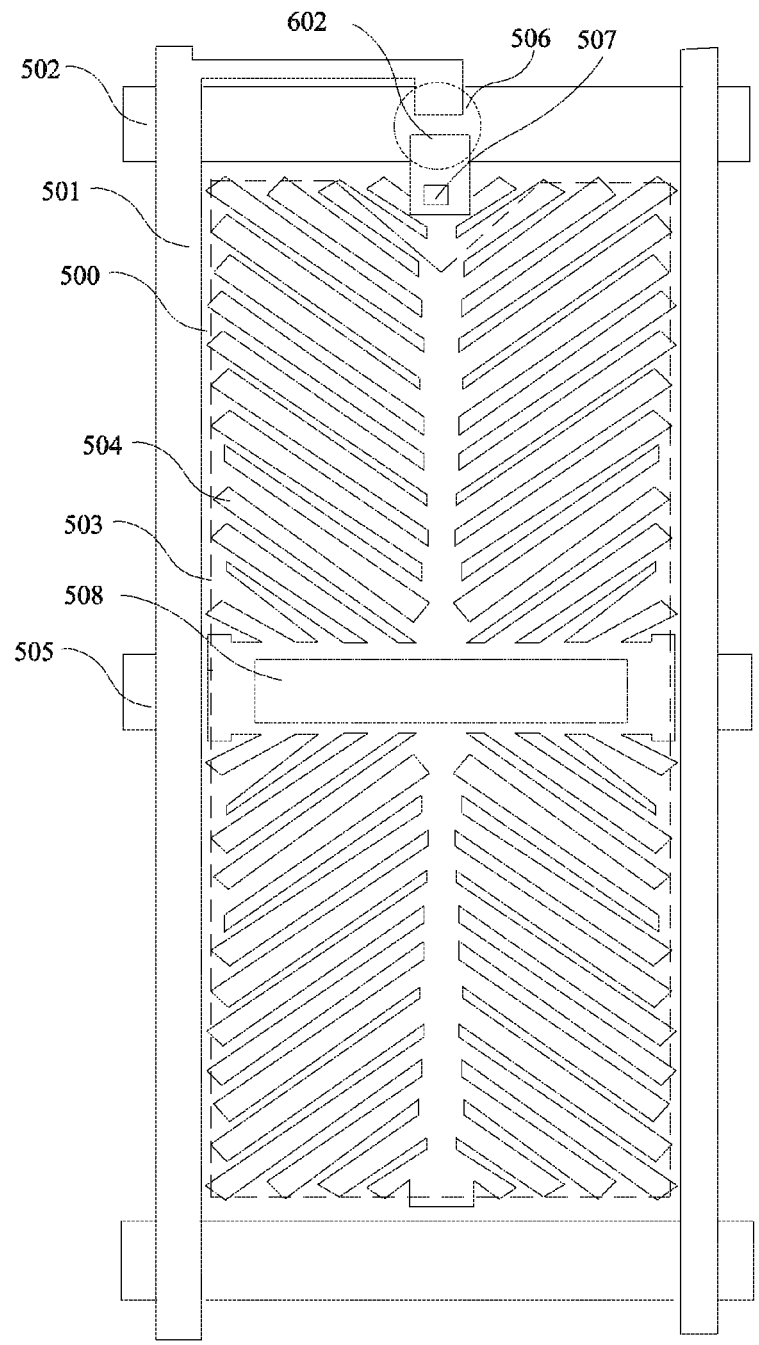
FIG. 8 is a schematic view showing a planar structure of a pixel of a second embodiment of thin-film transistor substrate according to the present invention.

As shown in FIG. 8, FIG. 8 is a schematic view showing a planar structure of a pixel of a second embodiment of TFT substrate according to the present invention.

The embodiment of the present invention comprises: a glass substrate 500, signal lines 501, scan lines 502, a first pixel electrode 503, a second pixel electrode 504, a common electrode 505, and a TFT 506. The TFT 506 has a source terminal 602 above which a via hole 507 is formed, and through the via hole 507, the second pixel electrode 504 is electrically connected to the source terminal 602 of the TFT 506.

The scan lines 502 and the signal lines 501 are arranged horizontally and vertically, respectively, to intersect each other. Two adjacent scan lines 502 and two adjacent signal lines 501, which intersect each other, collectively enclose and delimit a pixel display region of pixel.

The common electrode 505 is in the form of a strip and is partially located within the pixel display region. The common electrode 505 extends in the direction of the scan line 502 from one side of the pixel to the opposite side.

Both the first pixel electrode 503 and the second pixel electrode 504 have a central portion that is cruciform and comprise a plurality of fingers extending from the cruciform central portion in directions toward a perimeter of the pixel display region. The first pixel electrode 503 and the common electrode 505 partially overlap each other, and the first pixel electrode 503 forms a window opening 508 in the overlapping site. The second pixel electrode 504 covers the window opening 508.

Figure 9:
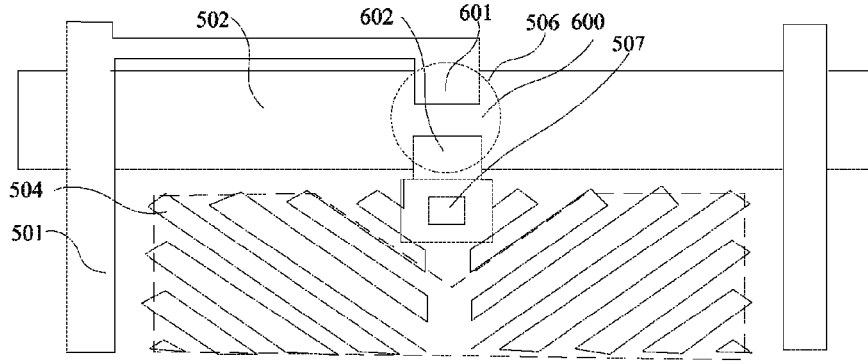
FIG. 9 is a partial enlarged view of the pixel of FIG. 7.

Also referring to FIG. 9, FIG. 9 is a partial enlarged view of the pixel of FIG. 7. The TFT 506 comprises a gate terminal 600, a drain terminal 601, and the source terminal 602. The gate terminal 600 is electrically connected to a scan line 502. The drain terminal 601 is electrically connected to a signal line 501. The source terminal 602 is electrically connected to the second pixel electrode 504. The TFT 506 serves as a switch of the pixel and controls whether and how the second pixel electrode 504 generates an electrical field. The signal line 501 and the scan line 502 are operable to control the TFT 506 in order to achieve the object of displaying.

Further, the present invention also provide an embodiment of the TFT substrate described above, of which the structure was described previously with reference to FIGS. 2-7.

Figure 10:
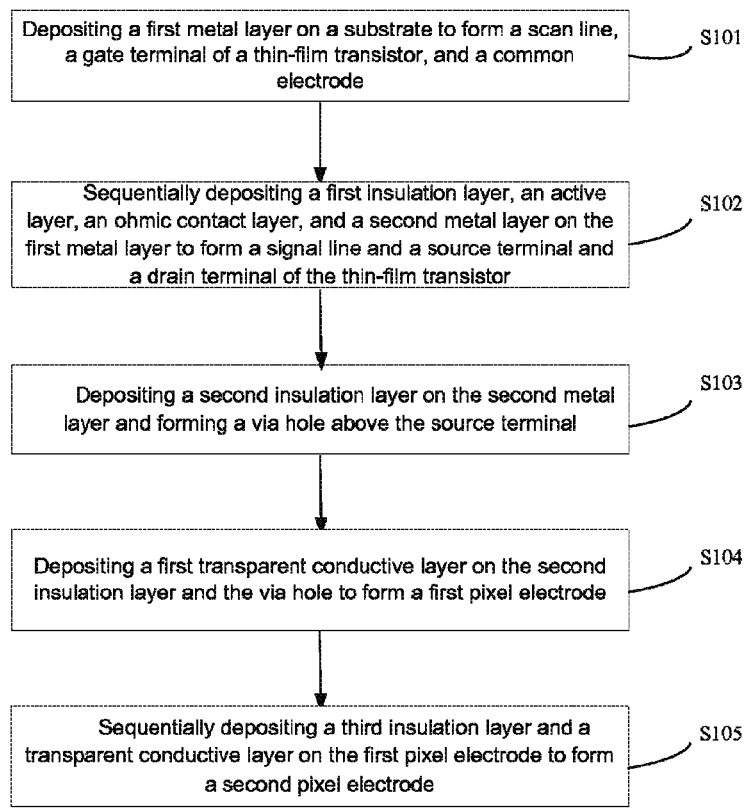
FIG. 10 is a flow chart showing a method for manufacturing thin-film transistor liquid crystal display device according to the present invention.

Referring to FIG. 10, as well as FIGS. 2-7, a method for manufacturing a TFT LCD according to the present invention comprises the following steps:

Step S101, in which a first metal layer is deposited on a glass substrate 200 to form a scan line 202, a gate terminal 300 of a TFT 206, and a common electrode 205, wherein the gate terminal 300 is electrically connected to the scan line 202 and the common electrode 205 extends in a direction of the scan line 202 from one side of a pixel to an opposite side;

Step S102, in which a first insulation layer, an active layer, an ohmic contact layer, and a second metal layer are sequentially deposited on the first metal layer to form a signal line 201 and a source terminal 302 and a drain terminal 301 of the TFT 206, wherein the signal line 201 and the scan line 202 intersect each other and the drain terminal 301 is electrically connected to the signal line 201;

Step S103, in which a second insulation layer is deposited on the second metal layer and a via hole 207 is formed above the source terminal 302, wherein the via hole 207 extends through the second insulation layer above the source terminal 302;

Step S104, in which a first transparent conductive layer is deposited on the second insulation layer and the via hole 207 to form a first pixel electrode 203, wherein the first pixel electrode 203 is located in a pixel display region enclosed by the intersected signal line 201 and scan line 202; and Step S105, in which a third insulation layer and a second transparent conductive layer are sequentially deposited on the first transparent conductive layer to form a second pixel electrode 204, wherein the second pixel electrode 204 is located in the pixel display region enclosed by the intersected signal line 201 and scan line 202 and the second pixel electrode 204 is electrically connected, through the via hole 207, to the source terminal 302, the first pixel electrode 203 being spaced from the common electrode 205 and the second pixel electrode 204 in a vertical direction, the first pixel electrode 203 and the second pixel electrode 204 partially overlapping each other, the second pixel electrode 204 forming a plurality of horizontally arranged slits 209, the first pixel electrode 203 forming a hollow structure 211 in a portion thereof overlapping the second pixel electrode 204;

the first pixel electrode 203 and the second pixel electrode 204 both having a central portion that is cruciform an comprising a plurality of fingers extending from the cruciform central portion in directions toward a perimeter of the pixel display region The common electrode 205 is a strip arranged to correspond to a horizontal section of a cruciform central portion of the first pixel electrode 203, whereby the first pixel electrode 203 and the common electrode 205 partially overlap each other. The first pixel electrode 203 forms a window opening 208 in the overlapping site in such a way that the second pixel electrode 204 covers the window opening 208.

To be distinguished from the state of the art, the present invention adds a second pixel electrode on the basis that a TFT that already has a first pixel electrode and makes a hollow structure in a portion of the first pixel electrode that overlaps the second pixel electrode, whereby adjusting the voltage level of the first pixel electrode may achieve an effect of improving view angle color shift and thus improving the quality of image.

Further, when the signal line applies a predetermined voltage, the first pixel electrode provides an effect of voltage division with respect to the common electrode and the second pixel electrode so as to obtain different voltage difference. When the first pixel electrode and the second pixel electrode simultaneously get saturated for brightness, increased pixel transmittance can be obtained thereby improving the transmittance. Further, different pixel voltages correspond to different tilt angle of liquid crystal and this also provides an effect of improving view angle color shift and thus improving the quality of image.

Further, the first pixel electrode forms a window opening in an overlapping site thereof with the common electrode of which an object is to increase storage capacitance between the common electrode and the second pixel electrode.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A thin-film transistor liquid crystal display device, comprising:
   a color filter substrate, a thin-film transistor substrate, and a liquid crystal layer interposed between the color filter substrate and the thin-film transistor substrate;
   the thin-film transistor substrate comprising a glass substrate and signal lines, scan lines, a first pixel electrode, a second pixel electrode, a common electrode, and a thin-film transistor formed on the glass substrate;
   the thin-film transistor comprising a gate terminal, a source terminal, and a drain terminal, the gate terminal being electrically connected to the scan line, the drain terminal being electrically connected to the signal line;
   a via hole being formed above the source terminal so that the source terminal is electrically connected through the via hole to the second pixel electrode;
   the signal line and the scan line being respectively arranged horizontally and vertically to intersect each other, the first pixel electrode and the second pixel electrode being located in a pixel display region that is enclosed and delimited by two adjacent signal lines and two adjacent scan lines that intersect each other;
   the common electrode being at least partially located in the pixel display region and extending in a direction of the scan line from one side of a pixel to an opposite side;
   the first pixel electrode and the second pixel electrode being sequentially formed on the common electrode; the first pixel electrode being spaced from the common electrode and the second pixel electrode in a vertical direction, the first pixel electrode partially overlapping the second pixel electrode; and
   the second pixel electrode forming a plurality of horizontally arranged slits, the first pixel electrode forming a hollow structure in a portion thereof that overlaps the second pixel electrode;
   whereby when the pixel display region displays a bright condition, the first pixel electrode and the second pixel electrode both apply voltages to the pixel display region to operate in brightness saturation.

2. The liquid crystal display device as claimed in claim 1, wherein:
   the second pixel electrode forms a plurality of horizontally arranged first fingers and a plurality of slits between the first fingers and the first pixel electrode forms a plurality of horizontally arranged second fingers and a plurality of slits between the second fingers, the first fingers of the second pixel electrode being formed above and corresponding to the slits of the first pixel electrode, the second fingers of the first pixel electrode being formed under and corresponding to the slits of the second pixel electrode.

3. The liquid crystal display device as claimed in claim 1, wherein:
   the second fingers of the first pixel electrode and the first fingers of the second pixel electrode are of the same width.

4. The liquid crystal display device as claimed in claim 1, wherein:
   the first pixel electrode and the second pixel electrode each have a central portion that is cruciform and comprise a plurality of fingers extending from the cruciform central portion in directions toward a perimeter of the pixel display region.

5. The liquid crystal display device as claimed in claim 4, wherein:
   the common electrode is in the form of a strip and arranged to correspond to a horizontal section of the cruciform central portion of the first pixel electrode, whereby the first pixel electrode and the common electrode at least partially overlap each other, the first pixel electrode forming a window opening in the overlapping site, the second pixel electrode covering the window opening.

6. The liquid crystal display device as claimed in claim 5, wherein:

the second pixel electrode, when put in operation, forms first coupling capacitance in the site of the window opening, the first coupling capacitance comprising a capacitor formed between the second pixel electrode and color filter substrate and the common electrode; the second pixel electrode forming second coupling capacitance in a site that is not the window opening, the second coupling capacitance comprising a capacitor formed between the second pixel electrode and the first pixel electrode, the color filter substrate, and the common electrode.

7. A thin-film transistor substrate of a liquid crystal display device, comprising:

a glass substrate and signal lines, scan lines, a first pixel electrode, a second pixel electrode, a common electrode, and a thin-film transistor formed on the glass substrate;

the thin-film transistor comprising a gate terminal, a source terminal, and a drain terminal, the gate terminal being electrically connected to the scan line, the drain terminal being electrically connected to the signal line;

a via hole being formed above the source terminal so that the source terminal is electrically connected through the via hole to the second pixel electrode;

the signal line and the scan line being respectively arranged horizontally and vertically to intersect each other, the first pixel electrode and the second pixel electrode being located in a pixel display region that is enclosed and delimited by two adjacent signal lines and two adjacent scan lines that intersect each other;

the common electrode being at least partially located in the pixel display region and extending in a direction of the scan line from one side of a pixel to an opposite side; the first pixel electrode and the second pixel electrode being sequentially formed on the common electrode;

the first pixel electrode being spaced from the common electrode and the second pixel electrode in a vertical direction, the first pixel electrode partially overlapping the second pixel electrode;

the second pixel electrode forming a plurality of horizontally arranged slits, the first pixel electrode forming a hollow structure in a portion thereof that overlaps the second pixel electrode;

whereby when the pixel display region displays a bright condition, the first pixel electrode and the second pixel electrode both apply voltages to the pixel display region to operate in brightness saturation.

8. The thin-film transistor substrate as claimed in claim 7, wherein:

the second pixel electrode forms a plurality of horizontally arranged first fingers and a plurality of slits between the first fingers and the first pixel electrode forms a plurality of horizontally arranged second fingers and a plurality of slits between the second fingers, the first fingers of the second pixel electrode being formed above and corresponding to the slits of the first pixel electrode, the second fingers of the first pixel electrode being formed under and corresponding to the slits of the second pixel electrode.

9. The thin-film transistor substrate as claimed in claim 7, wherein:

the second fingers of the first pixel electrode and the first fingers of the second pixel electrode are of the same width.

10. The thin-film transistor substrate as claimed in claim 7, wherein:

a via hole is formed above the source terminal so that the source terminal is electrically connected through the via hole to the second pixel electrode.

11. The thin-film transistor substrate as claimed in claim 7, wherein:

the first pixel electrode and the second pixel electrode each have a central portion that is cruciform and comprise a plurality of fingers extending from the cruciform central portion in directions toward a perimeter of the pixel display region.

12. The thin-film transistor substrate as claimed in claim 11, wherein:

the common electrode is in the form of a strip and arranged to correspond to a horizontal section of the cruciform central portion of the first pixel electrode, whereby the first pixel electrode and the common electrode at least partially overlap each other, the first pixel electrode forming a window opening in the overlapping site, the second pixel electrode covering the window opening.

13. The thin-film transistor substrate as claimed in claim 7, wherein:

when the pixel display region displays a bright condition, the first pixel electrode and the second pixel electrode both apply voltages to the pixel display region to operate in brightness saturation.

14. A method for manufacturing a thin-film transistor liquid crystal display device, comprising the following steps:

depositing a first metal layer on a glass substrate to form a scan line, a gate terminal of a thin-film transistor, and a common electrode, wherein the gate terminal is electrically connected to the scan line and the common electrode extends in a direction of the scan line from one side of a pixel to an opposite side;

sequentially depositing a first insulation layer, an active layer, an ohmic contact layer, and a second metal layer on the first metal layer to form a signal line and a source terminal and a drain terminal of the thin-film transistor, wherein the signal line and the scan line intersect each other and the drain terminal is electrically connected to the signal line;

depositing a second insulation layer on the second metal layer and forming a via hole above the source terminal, wherein the via hole extends through the second insulation layer above the source terminal;

depositing a first transparent conductive layer on the second insulation layer and the via hole to form a first pixel electrode, wherein the first pixel electrode is located in a pixel display region enclosed by the intersected signal line and scan line;

sequentially depositing a third insulation layer and a second transparent conductive layer on the first transparent conductive layer to form a second pixel electrode, wherein the second pixel electrode is located in the pixel display region enclosed by the intersected signal line and scan line, a via hole being formed above the source terminal, the source terminal being electrically connected through the via hole to the second pixel electrode, the first pixel electrode being spaced from the common electrode and the second pixel electrode in a vertical direction, the first pixel electrode and the second pixel electrode at least partially overlapping each other, the second pixel electrode forming a plurality of horizontally arranged slits, the first pixel electrode forming a hollow structure in a portion thereof overlapping the second pixel electrode, whereby when the pixel display region displays a bright condition, the first pixel electrode and the second pixel electrode both apply voltages to the pixel display region to operate in brightness saturation.

15. The method as claimed in claim 14, wherein:
the second pixel electrode forms a plurality of horizontally arranged first fingers and a plurality of slits between the first fingers and the first pixel electrode forms a plurality of horizontally arranged second fingers and a plurality of slits between the second fingers, the first fingers of the second pixel electrode being formed above and corresponding to the slits of the first pixel electrode, the second fingers of the first pixel electrode being formed under and corresponding to the slits of the second pixel electrode.

16. The method as claimed in claim 14, wherein:
the second fingers of the first pixel electrode and the first fingers of the second pixel electrode are of the same width.

17. The method as claimed in claim 16, wherein:
the first pixel electrode and the second pixel electrode each have a central portion that is cruciform and comprise a plurality of fingers extending from the cruciform central portion in directions toward a perimeter of the pixel display region.

18. The method as claimed in claim 17, wherein:
the common electrode is in the form of a strip and arranged to correspond to a horizontal section of the cruciform central portion of the first pixel electrode, whereby the first pixel electrode and the common electrode at least partially overlap each other, the first pixel electrode forming a window opening in the overlapping site, the second pixel electrode covering the window opening.

* * * * *